Feb. 9, 1960 G. W. SMITH 2,923,967
VENTING MEANS FOR RUBBER MIXERS AND THE LIKE
Filed March 20, 1958 2 Sheets-Sheet 1

INVENTOR
G. W. Smith
BY Rockwell & Bastalow
ATTORNEYS

Feb. 9, 1960 G. W. SMITH 2,923,967
VENTING MEANS FOR RUBBER MIXERS AND THE LIKE
Filed March 20, 1958 2 Sheets-Sheet 2

INVENTOR
G. W. Smith
BY
Rockwell Bartholow
ATTORNEYS

United States Patent Office 2,923,967
Patented Feb. 9, 1960

2,923,967

VENTING MEANS FOR RUBBER MIXERS AND THE LIKE

George W. Smith, Woodbridge, Conn., assignor to Farrel-Birmingham Company, Incorporated, Ansonia, Conn., a corporation of Connecticut Application March 20, 1958, Serial No. 722,815

8 Claims. (Cl. 18—2)

This invention relates to venting means for rubber mixers and like machines, and it has special reference to means whereby gases may be removed from the mixing chamber under such control that the gases will not have harmful effect in discharging, and any substantial loss of the material being worked will be inhibited.

In a rubber mixer such as a Banbury mixer, for example, there is usually employed a stack or chute above the mixing chamber, in which stack or chute is movable in a vertical direction a pressure ram or floating weight which is pressed downwardly for bringing pressure on the mass or batch of rubber or the like which is being agitated and worked upon by the rotors. It is usual practice to load the stack from one side and to arrange at the opposite side of the stack a connection or passage by which gases and dust or like material can be carried to a dust collector when the pressure ram is raised to a position in which gases in the mixing chamber can be released for upward movement. Such gases are generated in the mixing chamber when the mixer is used for certain purposes such as grinding vulcanized rubber or other materials which, during the grinding or like treatment, give off gases of decomposition. In prior devices it has been the practice to raise the ram from time to time to relieve the gas pressure, but owing to the manner in which some mixers have been organized and operated there has been likelihood of a "blow-up" or explosion effect consequent on raising of the ram. This result has had obvious disadvantages, including the fact that by such an explosion there has been considerable loss of valuable stock, which stock, instead of remaining in the mixing chamber, as is desired, is driven upwardly into a collector that is intended only to receive gas-carried dust or other worthless matter.

Usually the loading port for the stack is at one side of the latter and the upwardly extending passage to the dust collector at the opposite side, the ram being vertically movable in a plenum chamber having at times upward pressure of air toward the dust collector, and the degassing step takes place shortly after the ram starts its upward movement in order to reduce the pressure in the mixing chamber. The upper part of the stack, in which the ram is movable and which has the loading port and a portion of the gas and dust passage, forms a hopper in the lower portion of which the degassing operation is started.

An object of the present invention is to provide a valving means for degassing the hopper which is more rapid and satisfactory than means heretofore provided for this purpose.

A further object is to provide an improved arrangement and cooperation of the ram and its guiding means in the nature of a stack or hopper, whereby the escape of gas at the degassing period is gradual and nonexplosive and whereby loss of stock that has undergone grinding or maceration is effectively inhibited.

A still further object is to provide apparatus such as above mentioned wherein a superior structure of degassing valving port is employed.

To these and other ends the invention consists in the novel features and combinations of parts hereinafter described and pointed out in the claims.

Figure 1:
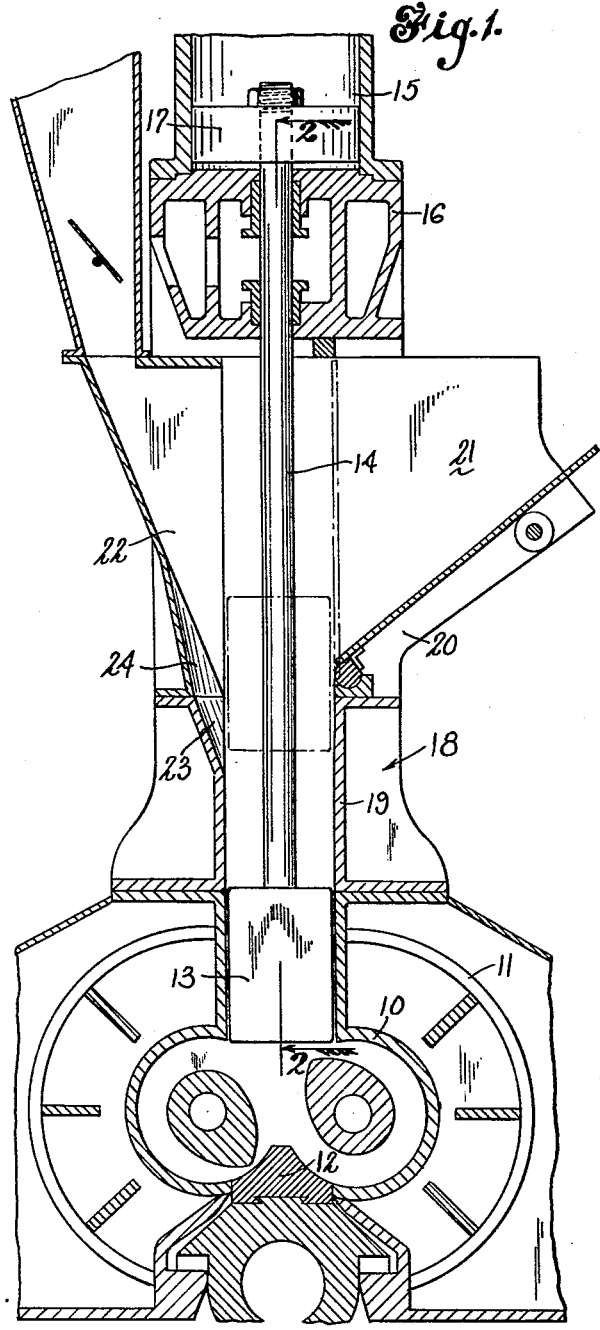
Fig. 1 is a vertical central section of a mixer apparatus embodying the invention, showing the ram in its lower or working position.

In the apparatus shown in the drawings, a Banbury mixer has an outer casing in this instance through which water or other fluid can be circulated for raising the temperature of the mass being treated. The mixing chamber has the usual rotors under which is located a discharge door, and above the rotors a pressure ram or floating weight is used for imposing pressure on the material in the mixing chamber, this ram being mounted in a stack or guideway and being connected with a piston operating in an upper cylinder used for raising and lowering the ram by fluid pressure. The stack structure is of the type mentioned above, embodying a vertical guideway in which the ram can move up and down, and an upper hopper structure having, in this particular example, a loading port at one side and a gas and dust passage inclined upwardly at the opposite side, the latter passage extending from the lower part of the ram guide to a location which is above the uppermost position of the ram.

In the drawings, the wall defining the mixing chamber is indicated at 10, the heating jacket at 11, the lower discharge door for the chamber at 12, the pressure ram at 13, a piston rod fastened at its lower end to the ram, at 14, an upper fluid cylinder at 15, a base member for the cylinder at 16, and a piston in cylinder 15, at 17. The stack member is indicated generally at 18, the lower part of this stack member being mounted on an upward guiding extension of the mixing chamber, as shown in Fig. 1. The lower section of the stack is indicated at 19, and above this is a section 20 providing a loading opening 21. A suitable member is provided to serve as a removable cover for the loading opening or port.

Figure 2:
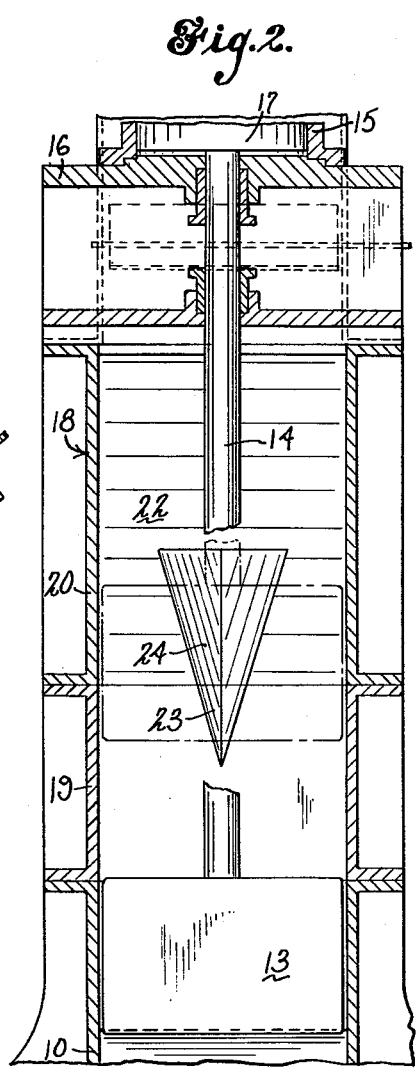
Fig. 2 is a section on line 2—2 of Fig. 1.

The gas and dust passage 22, heretofore mentioned, is at the side opposite the loading opening, and this passage or connection extends from a point somewhat below the upper boundary of stack portion 19 to a point above the uppermost position of the pressure ram. The lowermost part of passage 22 is indicated at 23, and this portion of the passage, in connection with a part 24 in section 20 of the stack, provides in the dust passage a valving part which is of the shape shown in Figs. 1 and 2. This part, as shown in Fig. 2, is of V shape in elevation, the part 23 having vertical side portions against which the ram 13 may contact as the ram is moved vertically. The other part 24 of this passage section has its inner sides sloped upwardly and laterally, as shown, in Fig. 1, so as not to have contact with the adjacent face of the ram.

The ram is rectangular in horizontal section and in vertical section, and one of the lateral faces of the ram contacts the part in which the passage portion 23 is formed. The shape of passage portion 23 is such that when the mixer is in the operating position, as shown in Fig. 1, the ram is in a position to close this passage against discharge of gas, but when the lower edge of the ram moves upwardly to a very small degree beyond passage portion 23, gas in the lower portion of the stack starts to issue into the dust passage, and, as the ram continues its movement, the capacity of the passage is continually enlarged, thus increasing the flow of gas gradually but continuously within proper limits.

In this manner violent disturbance or explosion in the chute incidental to the opening of the gas passage is inhibited and dust-carrying gas is eliminated quickly and without malfunctioning of the apparatus and without loss of stock material intended to be retained in the mixing chamber.

It will be understood from Figs. 1 and 2 that the passage portion 23 is extended to the upper end of stack section 19 and in that region has a width taking up only a small part of the horizontal lengthwise dimension of the stack or chute, the side portions of passage 23 tapering to a lower point, and it will be understood that in section 20 of the stack the lateral edges of passage 24 are sloped away from the path of the ram.

Figure 3:
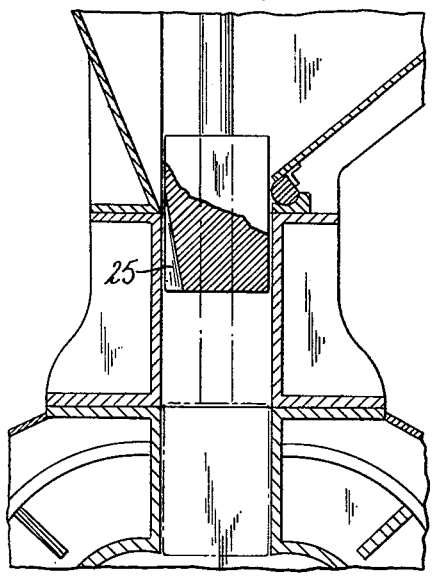
Fig. 3 is a fragmentary vertical section, partly broken away, showing a modified form of the valving means.
Figure 4:
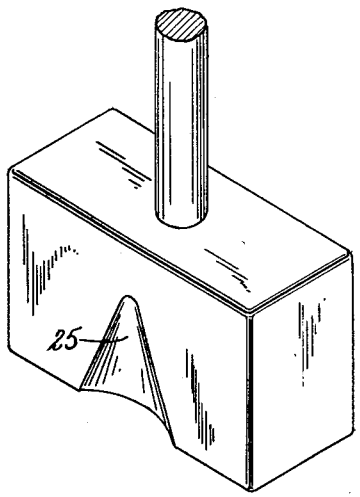
Fig. 4 is a detail perspective view of the ram shown in Fig. 3.

In Figs. 3 and 4 there is shown a modified form of venting means associated with the ram and stack, which venting means secures results and benefits similar to those of the structure described above. In this second form the ram body is provided with a face groove tapering laterally in an upward direction and increasing in depth from a point intermediate the height of the ram to the lower edge of the latter. This groove is indicated at 25 and is on one of the longer faces of the oblong ram. The part of the stack which cooperates with this groove is shown in Fig. 3. Except for the groove 25, the ram fits closely in the stack. The discharging action begins to take place when the ram, in moving upwardly, reaches a position slightly below that shown in Fig. 3. As in the form first described, that section of the stack resting on the section which is placed on the mixing-chamber extension, is sloped upwardly so that in the region referred to the dust passage increases in capacity continuously in an upward direction so that dust, entering the hopper portion of the apparatus, as permitted by the ram position, has a free and yet sufficiently slow movement upwardly in the dust passage.

Figure 5:
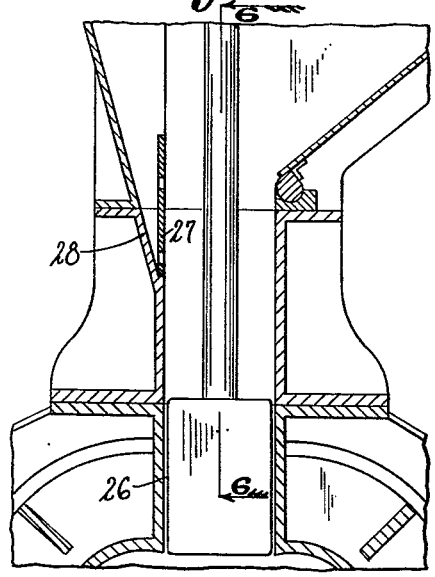
Fig. 5 is a vertical sectional view showing a further modification of the valving means.
Figure 6:
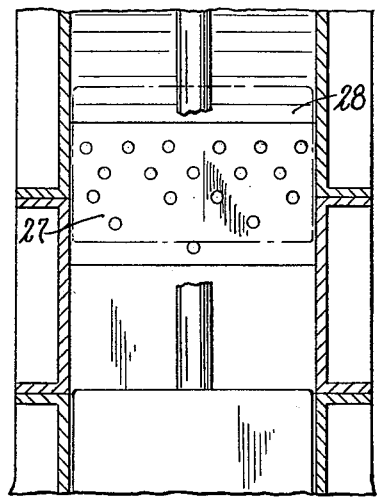
Fig. 6 is a section on line 6—6 of Fig. 5.

In Figs. 5 and 6 a further modification of the venting means is shown. In this form neither the ram face nor the cooperating part of the stack or chute is grooved. The ram face at the corresponding side of the ram is planar over its area, but this face cooperates with a perforated vertical plate mounted in the stack. The planar face of the ram is indicated at 26 and the cooperating perforated plate is indicated at 27. The side wall of the stack with which plate 27 is associated has an upwardly sloping side-wall portion 28. This extends throughout the long horizontal dimension of the stack, but its slope can be similar to that of the passage 23 in the form first described. As best shown in Fig. 6, the perforations of the plate 27 are so arranged that the effective perforation area increases from the lower end portion of the plate to the upper end portion. In this particular case the perforations are arranged in horizontal rows. The uppermost row has, say, six perforations and extends substantially through the length of the plate, but in a descending direction the rows are shorter and have less effective area, as is apparent from Fig. 6.

In the operation of this venting means, venting takes place gradually as before. Discharge of gas and dust commences when the ram uncovers a single perforation and the amount of discharge increases as the ram moves upwardly, as in the forms previously described.

Thus by the structure described herein the important advantages mentioned in the introductory part of this specification are secured and the mixer apparatus notably improved.

It has been mentioned above that gases generated in the mixing chamber, which should be discharged, may be created in grinding vulcanized rubber or other materials which give off gases of decomposition. This is but one example of the work in which the structure herein described is useful. It is useful in various other operations such as reclaiming of rubber, and devolatilization of certain plastic materials from which gases can be removed, as well as in the dewatering of rubber and other materials such as previously mentioned.

While, in the forms shown in the drawings, the loading port or opening and the gas passage are at opposite sides of the hopper, various other arrangements may be employed.

In the form first described, the vent opening is described as being of V shape. It will be understood that the opening may be in the shape of a parabola open at the top, i.e., involving a curved rather than a straight outline; or a slanted opening may be used which in operation would gradually expose a greater area of opening as the loading ram is raised.

It is to be understood that various other modifications and changes in the details may be made without departure from the principles of the invention and the scope of the claims.

What I claim is:

1. In a mixer for rubber or other plastic material, a rotor-equipped closable mixing chamber, a ram-guiding stack extending upwardly from said mixing chamber, said stack having at its upper part a hopper having a loading opening and provided at one side with a discharge passage for gas communicating with a lower portion of said stack, a vertically movable ram in said stack which is movable upwardly from said mixing chamber to release pressure in said chamber and permit upward movement of gas in the stack into said passage, and valve means between said stack and the lower end portion of said gas passage, effective prior to the raising of the ram to a point where its lower edge reaches the lower end portion of the passage, to provide a gradually greater delivery of gas to said passage in response to the height to which the ram is raised.

2. The combination of claim 1, in which said valving means comprises cooperating parts of the ram and of the stack.

3. The combination of claim 2, in which a grooved lateral portion of the stack cooperates with a side face of the ram.

4. The combination of claim 2, in which a grooved face portion of the ram cooperates with a stack portion facing said ram portion.

5. The combination of claim 2, in which a planar side face of the ram cooperates with a perforated plate mounted in the stack.

6. In a mixer such as described, the combination of a vertically movable pressure member having a lower ram, a stack in which the ram is guided, a mixing chamber at the lower end of the stack, a gas-discharge passage leading from the stack at a lower portion of the latter in an upward direction, and valve means controlled by the raising of the ram for effecting gradual delivery of gas from the lower part of the stack to said gas passage in response to the height to which the ram is raised.

7. The combination of claim 6, in which said valve means includes a part of the ram and a part carried by the stack.

8. The combination of claim 1, in which the loading opening and the upwardly sloping gas passage are at opposite sides of the hopper.

References Cited in the file of this patent

UNITED STATES PATENTS

| | | |
|---|---|---|
| 2,680,264 | MacLoed | June 8, 1954 |
| 2,749,590 | Kilpatrick | June 12, 1956 |